United States Patent
Lee et al.

(10) Patent No.: US 8,379,554 B2
(45) Date of Patent: *Feb. 19, 2013

(54) PERIODIC RANGING IN A WIRELESS ACCESS SYSTEM FOR MOBILE STATION IN SLEEP MODE

(75) Inventors: Chang-Jae Lee, Chungcheongnam-do (KR); Ki-Seon Ryu, Seoul (KR); Beum-Joon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 692 days.

This patent is subject to a terminal disclaimer.

(21) Appl. No.: 12/470,339

(22) Filed: May 21, 2009

(65) Prior Publication Data

US 2009/0291717 A1    Nov. 26, 2009

Related U.S. Application Data

(63) Continuation of application No. 11/674,991, filed on Feb. 14, 2007, now Pat. No. 7,558,605, which is a continuation of application No. 11/201,229, filed on Aug. 9, 2005, now Pat. No. 7,194,288.

(30) Foreign Application Priority Data

Aug. 9, 2004   (KR) .................. 10-2004-0062623

(51) Int. Cl.
  *G08C 17/00*    (2006.01)
  *H04B 1/16*    (2006.01)
  *G08B 5/22*    (2006.01)

(52) U.S. Cl. .................. 370/311; 455/343.1; 455/343.2; 455/343.5; 455/343.6; 340/7.32; 340/7.38

(58) Field of Classification Search .................. None
See application file for complete search history.

(56) References Cited

U.S. PATENT DOCUMENTS 6,519,449 B1    2/2003    Zhang et al.
(Continued)

FOREIGN PATENT DOCUMENTS

EP          1594233 A2       11/2005
JP       2007-533250 A       11/2007
(Continued)

OTHER PUBLICATIONS

Shin et al., "Comments on Sleep mode supporting the periodic ranging with compressed format of SLP ID fields in MOB_TRF-IND message", IEEE 802.16 Broadband Wireless Access Working Group <http://ieee802.org/16>, Aug. 24, 2004.

(Continued)

*Primary Examiner* — Ian N Moore
*Assistant Examiner* — Brian T Le
(74) *Attorney, Agent, or Firm* — Birch, Stewart, Kolasch & Birch, LLP

(57) ABSTRACT

A method of performing a ranging process between a base station and a mobile station in sleep mode in a wireless access system, wherein the base station provides the mobile station with an initial notification of a periodic ranging time that occurs during a sleep time interval and during which the mobile station is to perform the ranging process, the initial notification included in a first message, the first message indicating whether the mobile station should terminate sleep mode to receive downlink data, and wherein the base station provides the mobile station with subsequent notifications of periodic ranging times that occur during the sleep time interval, the subsequent notifications indicated in a second message, the second message transmitted to the mobile station as part of the ranging process such that the mobile station performs a plurality of ranging processes within the sleep time interval.

9 Claims, 11 Drawing Sheets

U.S. PATENT DOCUMENTS

| | | |
|---|---|---|
| 6,690,655 B1 | 2/2004 | Miner et al. |
| 6,742,186 B1 | 5/2004 | Roeck |
| 7,194,288 B2 * | 3/2007 | Lee et al. ............... 455/574 |
| 7,289,804 B2 | 10/2007 | Kim |
| 7,430,421 B2 * | 9/2008 | Park ................... 455/456.1 |
| 7,558,605 B2 * | 7/2009 | Lee et al. ............... 455/574 |
| 2002/0036985 A1 | 3/2002 | Jonas et al. |
| 2002/0191684 A1 | 12/2002 | Min et al. |
| 2004/0174845 A1 | 9/2004 | Koo et al. |
| 2004/0185852 A1 | 9/2004 | Son et al. |
| 2005/0019717 A1 | 1/2005 | Chan et al. |
| 2005/0030931 A1 | 2/2005 | Sung et al. |
| 2005/0041573 A1 | 2/2005 | Eom et al. |
| 2005/0049012 A1 | 3/2005 | Chang et al. |
| 2005/0054389 A1 | 3/2005 | Lee et al. |
| 2005/0058058 A1 | 3/2005 | Cho et al. |
| 2005/0075148 A1 | 4/2005 | Park |
| 2005/0122936 A1 | 6/2005 | Son et al. |
| 2005/0162314 A1 | 7/2005 | Bromley et al. |
| 2005/0265376 A1 | 12/2005 | Chapman et al. |
| 2005/0272481 A1 | 12/2005 | Kim |
| 2005/0288022 A1 | 12/2005 | Ryu et al. |
| 2009/0291715 A1 * | 11/2009 | Lee et al. ............... 455/574 |
| 2009/0291717 A1 | 11/2009 | Lee et al. |

FOREIGN PATENT DOCUMENTS

| | | |
|---|---|---|
| WO | WO 2005/109692 A1 | 11/2005 |

OTHER PUBLICATIONS

Son et al., "Periodic ranging in Sleep mode", IEEE 802.16 Broadband Wireless Access Working Group <http://ieee802.org/16>, pp. 1-7, Mar. 17, 2004.

Samsung et al. "Periodic ranging in Sleep Mode" IEEE 802.16 Broadband Wireless Access Working Group, IEEE C802.16e-04/24r2, Mar. 17, 2004.

Samsung et al. "Enhancement to the Periodic Ranging" IEEE 802.16 Broadband Wireless Access Working Group, IEEE C802.16e-04/56r2, May 17, 2004.

Son et al. "Sleep mode supporting the periodic ranging with compressed format of SLP ID fields in MOB_TRF_IND message—Harmonization Ad-Hoc Consensus Contribution" IEEE 802.16 Broadband Wireless Access Working Group, IEEE C802.16e-04/330, Aug. 17, 2004.

* cited by examiner

FIG. 1
Related Art

| Syntax | Size | Notes |
|---|---|---|
| SLP-REQ Message Format (){ | | |
| Management Message Type=50 | 8 bits | |
| Initial-sleep window | 6 bits | |
| Final-sleep-window base | 10 bits | |
| listening interval | 4 bits | |
| Final-sleep-window exponent | 3 bits | |
| reserved | 1 bits | |
| } | | |

FIG. 2
Related Art

| Syntax | Size | Notes |
|---|---|---|
| MOB-SLP-RSP Message Format (){ | | |
| Management Message type=51 | 8 bits | |
| Sleep-approved | 1 bit | 0 : Sleep-mode request denied<br>1 : Sleep-mode request approved |
| If(Sleep-approved=0){ | | |
| After-REQ-action | 1 bit | 0 : The MSS may retransmit the MOB-SLP-REQ message after the time duration(REQ-duration) given by the BS in this message<br>1 : The MSS shall not retransmit the MOB-SLP-REQ message and shall await the MOB-SLP-RSP message from the BS |
| REQ-duration | 4 bits | Time duration for case when After-REQ-action value is 0 |
| reserved | 2 bits | |
| } | | |
| else } | | |
| Start frame | 6 bits | |
| initial-sleep window | 6 bits | |
| final-sleep wndow base | 10 bits | |
| listening interval | 4 bits | |
| final-sleep window exponent | 3 bits | |
| SLPID | 10 bits | |
| } | | |
| } | | |

FIG. 3
Related Art

| Syntax | Size | Notes |
|---|---|---|
| MOB-TRF-IND Message Format (){ | | |
| Management Message type=52 | 8 bits | |
| FMT | 1 bit | 0 : SLPID based format<br>1 : CID based format |
| if(FMT=0){ | | |
| Byte of SLPID bit-map | 8 bits | |
| SLPID bit-map | Variable | Two bits are allocated to one MSS<br>00 : No periodic ranging opportunity and no PDUs such as DL Traffic.<br>01 : No periodic ranging, but PDUs such as DL Traffic.<br>10 : Periodic Ranging opportunity and no PDUs such as MAC Management message(the MSS may return to sleep mode after periodic ranging operation).<br>11 : Periodic Ranging opportunity and PDUs such as MAC Management message (the MSS shall maintain Awake mode after Periodic Ranging operation). |
| NUM of MSS periodic ranging | 8 bits | |
| for (I=0; I<NUM of MSS Periodic Ranging;I++) { | | |
| Ranging Frame offset | 10 bits | Frame Offset for case where SLPID bit map indication is set to '10' or '11' |
| } | | |
| }else { | | |
| Num-pos | 7 bits | Number of CIDs on the positive indication list |
| for (i=0; I<Num-pos;I++) { | | |
| Short Basic CID | 12 bits | Basic CID |
| } | | |
| while(!(byte_boundary)) { | | |
| Padding bits | 1 bit | Padding for byte alignment |
| } | | |
| } | | |
| } | | |

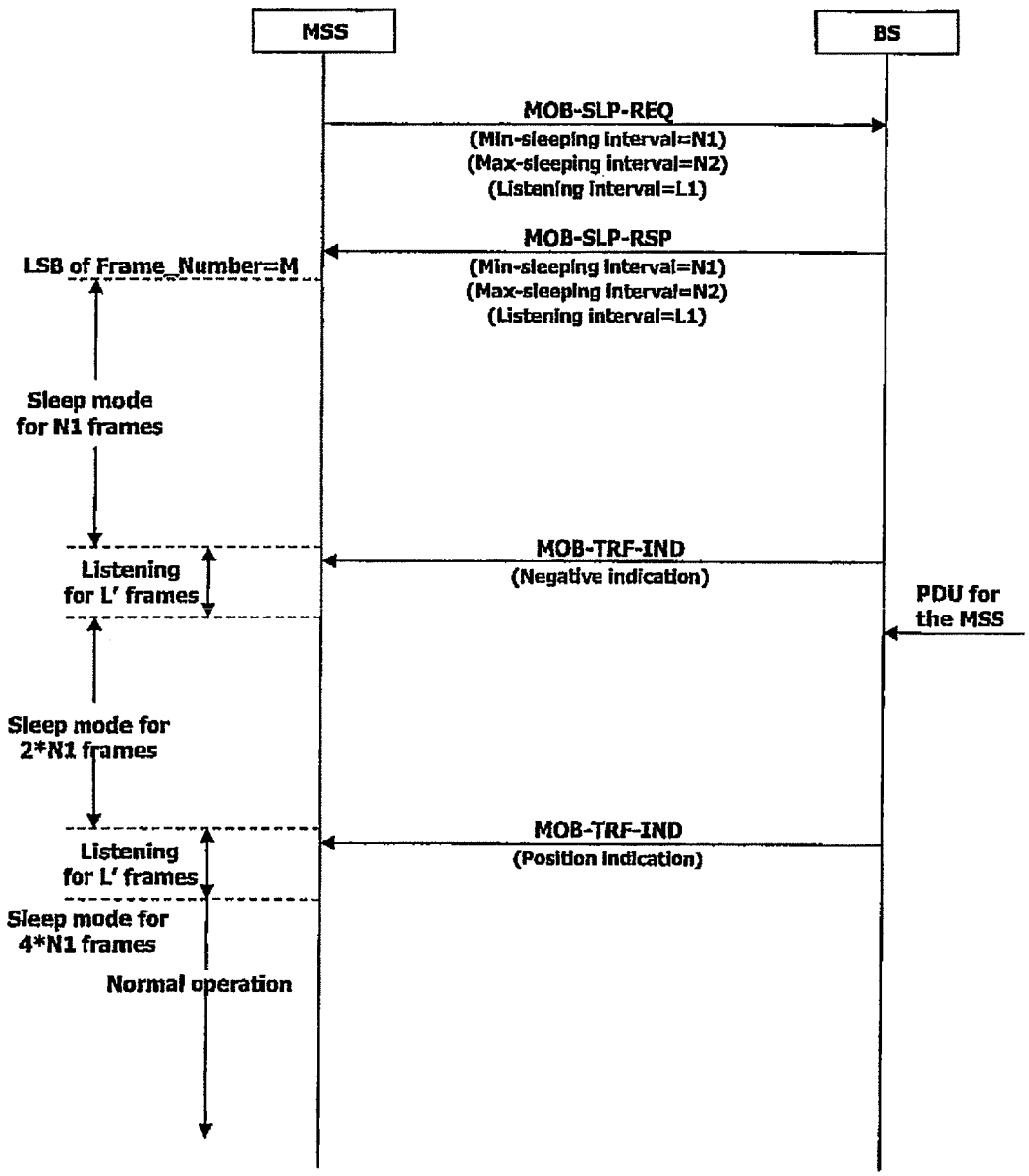

FIG. 8

| Name | Type(1byte) | Length | Value(Variable-length) |
|---|---|---|---|
| Ranging Frame Offset | TBD | 2 | Frame Offset for case where the next periodic ranging opportunity is included in a single sleep window |

FIG. 9

| Syntax | Size | Notes |
|---|---|---|
| MOB-SLP-RSP Message Format (){ | | |
| Management Message type=51 | 8 bits | |
| Sleep-approved | 1 bit | 0 : Sleep-mode request denied<br>1 : Sleep-mode request approved |
| If(Sleep-approved=0){ | | |
| After-REQ-action | 1 bit | 0 : The MSS may retransmit the MOB-SLP-REQ message after the time duration (REQ-duration) given by the BS in this message.<br>1 : The MSS shall not retransmit the MOB-SLP-REQ message and shall await the MOB-SLP-RSP message from the BS |
| REQ-duration | 4 bits | Time duration for case where After-REQ-action Value is 0 |
| reserved | 2 bits | |
| } | | |
| else } | | |
| Start frame | 6 bits | |
| Initial-sleep window | 6 bits | |
| final-sleep wndow base | 10 bits | |
| listening interval | 4 bits | |
| final-sleep window exponent | 3 bits | |
| SLPID | 10 bits | |
| Periodic Ranging frame offset | TBD | |
| Periodic Ranging Cycle | TBD | |
| } | | |
| } | | |

PERIODIC RANGING IN A WIRELESS ACCESS SYSTEM FOR MOBILE STATION IN SLEEP MODE

CROSS-REFERENCE TO RELATED APPLICATIONS

This application is a Continuation of application Ser. No. 11/674,991 filed on Feb. 14, 2007 now U.S. Pat. No. 7,558,605, which is a continuation of U.S. application Ser. No. 11/201,229, filed on Aug. 9, 2005 now U.S. Pat. No. 7,194,288, and for which priority is claimed under 35 U.S.C. §120; and this application claims priority of Application No. 10-2004-0062623, filed in Korea on Aug. 9, 2004, under 35 U.S.C. §119; the entire contents of all are hereby incorporated by reference.

FIELD OF THE INVENTION

The present invention relates generally to a wireless access system and, more particularly, to a mobile station in sleep mode in a wireless access system.

BACKGROUND OF THE INVENTION

A wireless access system supports a sleep mode of a mobile station in order to minimize power consumption. A mobile station in a sleep mode is operates according to a sleep interval, which increases at a certain ratio. The sleep interval includes a listening window (e.g., listening interval) and a sleep window (e.g., sleep interval).

The listening interval is fixed by a sleep request message and a sleep response message. During the listening interval, a mobile station receives an indication of whether downlink traffic is being transmitted to the mobile station through a broadcast MAC management message (e.g., MOB-TRF-IND) sent from a base station (BS). The mobile station also receives an indication of whether ranging for maintaining uplink communications and a proper downlink coding type based on signal quality should be performed.

The sleep interval is a period during which the mobile station receives only a minimum downlink signal from a base station in order to reduce power consumption. During the sleep interval, the mobile station scans neighboring base stations for a handover and performs ranging for maintaining uplink communications and a proper downlink coding type according to signal quality.

The operation in the sleep mode includes transmitting and receiving a MAC management message, such as a sleep request (e.g., MOB-SLP-REQ) message, a sleep response (e.g., MOB-SLP-RSP) message or a broadcast downlink traffic indication (e.g., MOB-TRF-IND) message, between a mobile station and a base station.

FIG. 1 illustrates an exemplary sleep request message transmitted by a mobile station to a serving base station to request sleep mode.

Referring to FIG. 1, the MOB-SLP-REQ message is a type of MAC message used for the sleep mode operation and includes a sleep interval and a listening interval.

FIG. 2 illustrates an exemplary sleep response message transmitted by the serving base station to the mobile station.

Referring to FIG. 2, the MOB-SLP-REQ message includes sleep mode-related information such as information regarding whether a sleep mode is approved, a sleep interval, a listening interval, or a sleep ID.

FIG. 3 illustrates an exemplary broadcast traffic indication message transmitted to the mobile station at a certain interval.

Referring to FIG. 3, upon receiving the MOB-TRF-IND message during a listening interval, the mobile station in the sleep mode determines whether to maintain the sleep mode, to terminate the sleep mode and receive downlink data, or to perform ranging during a sleep interval.

FIG. 4 is a signal flow diagram illustrating operation in the sleep mode.

Referring to FIG. 4, a mobile station generates a sleep request (e.g., MOB-SLP-REQ) message. The sleep request message includes values for an initial sleep interval (e.g., initial sleep window), a final sleep interval (e.g., final sleep window), and a listening interval. The mobile station then transmits the MOB-SLP-REQ message to a base station to request transition to a sleep mode. The base station transmits to the mobile station a sleep response (e.g., MOB-SLP-RSP) message in which the initial sleep interval, the final sleep interval, the listening interval, and a conversion start frame are set, thereby approving the transition to the sleep mode.

Accordingly, when a sleep mode conversion start time (e.g., M) has been reached, the mobile station maintains a sleep mode during the initial sleep interval (e.g., N1 frame). Thereafter, when the initial sleep interval expires, the mobile station receives a traffic indication (e.g., MOB-TRF-IND) message from the base station during a listening interval (e.g., L'). If no downlink traffic is being transmitted to the mobile station (e.g., a negative indication), the mobile station maintains a sleep mode during a period that is twice (e.g., 2*N1) as long as the initial sleep interval (e.g., N1).

The sleep interval is continuously increased according to the aforementioned equation such that the next sleep interval is set to be twice as long as the previous sleep interval. When the sleep interval reaches the final sleep interval (e.g., N2), the mobile station repeatedly uses the final sleep interval as the next sleep interval. The final sleep interval (e.g., sleep window) is set as follows according to the parameters shown in FIG. 2.

$$\text{Final sleep window} = \text{final sleep window} * 2^{final\ sleep\ window}.$$

In contrast, if the mobile station is notified via a traffic indication (e.g., MOB-TRF-IND) message during the listening interval (e.g., a positive indication) that there is downlink traffic being transmitted to the mobile station, the mobile station terminates the sleep mode and receives the downlink traffic in a normal mode (e.g., awake mode). Furthermore, when receiving any uplink data, except for a ranging request (e.g., RNG-REQ) message, from the mobile station in sleep mode, the base station determines that the mobile station has terminated the sleep mode.

When there is no uplink signal from a specific mobile station during a certain period (e.g., a driving time of timer T27), the base station allocates an uplink slot to the mobile station, thereby allowing the mobile station to transmit to the base station a ranging request message for maintaining uplink synchronization (e.g., time, frequency and uplink transmission power) and for maintaining a proper coding rate according to signal quality. The base station, having received the ranging request message, sets a compensation value (e.g., time, frequency and uplink transmission power) for maintaining the uplink synchronization in a ranging response message and transmits the ranging response message to the mobile station.

FIG. 5 illustrates periodic ranging of a mobile station in the sleep mode.

Referring to FIG. 5, the base station sets, in a broadcast traffic indication (e.g., MOB-TRF-IND) message, a ranging operation time (e.g., ranging offset) and an information regarding whether or not the ranging is performed, and transmits the MOB-TRF-IND message to the mobile station in a sleep mode. The mobile station in the sleep mode receives the MOB-TRF-IND message during a listening interval.

Thereafter, when the ranging time has been reached, the mobile station transmits a ranging request (e.g., RNG-REQ) message to the base station using the allocated uplink slot, and the base station transmits a ranging response (e.g., RNG-RSP) message to the mobile station. The base station allocates an uplink link bandwidth (e.g., UL BW) for a periodic RNG-REQ. Accordingly, the mobile station receives the ranging response (e.g., RNG-RSP) message, adjusts the uplink synchronization with the base station, and maintains the sleep mode.

If there is a need for the mobile station in a sleep mode to perform periodic ranging during a sleep interval, the base station sets, in a broadcast MOB-TRF-IND message, a ranging operation time and information regarding whether the ranging is performed, and transmits the MOB-TRF-IND message to the mobile station. Thereafter, when recognizing that there is downlink traffic or that there is no ranging operation from the received MOB-TRF-IND message during the listening interval, the mobile station maintains a sleep mode during a sleep interval that is twice as long as a present sleep interval.

FIG. 6 illustrates a relationship between a sleep ID (SLPID) bitmap and a sleep ID in a traffic indication message.

Referring to FIG. 6, the format of the MOB-TRF-IND message is the same as that of FIG. 3.

For example, assuming that an SLPID bitmap of the MOB-TRF-IND is the same as that shown in FIG. 6, SLPID mobile stations that should perform periodic ranging are indicated. Assuming a number of mobile stations performing periodic ranging is seven, a ranging time (e.g., ranging frame offset) of each mobile station is set as follows.

Ranging frame offset 1: frame offset of SLPID 2
Ranging frame offset 2: frame offset of SLPID 8
Ranging frame offset 3: frame offset of SPLID 9
Ranging frame offset 4: frame offset of SLPID 12
Ranging frame offset 5: frame offset of SLPID 15
Ranging frame offset 6: frame offset of SLPID 18
Ranging frame offset 7: frame offset of SLPID 20

Therefore, a single mobile station may perform only one periodic ranging during the next sleep interval after a listening interval. Only one periodic ranging may be performed by the single mobile station because, while the SLPID bitmap may indicate whether or not the ranging is performed, the SLPID bitmap may not indicate the number of times that ranging is to be performed.

In the related art, the base station performs periodic ranging using a specific timer (e.g., T27). If the base station cannot receive any uplink signal from a specific mobile station before the timer expires, the base station allocates an uplink slot to a mobile station to allow the mobile station to transmit a ranging request message to the base station and to perform the ranging operation. If the base station receives the uplink signal from the specific mobile station before the corresponding timer expires, the timer is reset. As described above, the sleep interval of a sleep mode increases exponentially from an initial sleep interval to a final sleep interval. The final sleep interval (e.g., sleep window) is set through a predetermined formula.

FIG. 7 illustrates a relationship between a periodic ranging period and a sleep interval.

Referring to FIG. 7, if a sleep interval is longer than a periodic ranging cycle, the mobile station is requested to perform periodic ranging two or more times during a corresponding sleep interval. However, in the related art, periodic ranging with respect to a single mobile station may not be performed more than once during a sleep interval, which creates problems because periodic ranging during the sleep mode may not be provided.

SUMMARY OF THE INVENTION

Accordingly, the present invention is directed to periodic ranging in a wireless access system that substantially obviates one or more problems due to limitations and disadvantages of the related art.

An object of the present invention is to perform a plurality of periodic ranging operations during a single sleep interval.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method of performing a ranging process between a base station and a mobile station in sleep mode in a wireless access system comprises, wherein the base station provides the mobile station with an initial notification of a periodic ranging time that occurs during a sleep time interval and during which the mobile station is to perform the ranging process, the initial notification included in a first message, the first message indicating whether the mobile station should terminate sleep mode to receive downlink data, and provides the mobile station with subsequent notifications of periodic ranging times that occur during the sleep time interval, the subsequent notifications indicated in a second message, the second message transmitted to the mobile station as part of the ranging process such that the mobile station performs a plurality of ranging processes within the sleep time interval.

The first message may be a traffic indicator message and the second message may be a ranging response message. The subsequent notifications of periodic ranging times in the second message may comprise a type length value (TLV) form. The initial notification of periodic ranging time in the first message may comprise a type length value (TLV) form. The second message may comprise an indication whether the mobile station should terminate sleep mode to receive downlink data. The indication whether the mobile station should terminate sleep mode to receive downlink data may comprise a type length value (TLV) form.

In another embodiment a method of performing a ranging process between a base station and a mobile station in sleep mode in a wireless access system comprises, in the mobile station, setting a sleep time interval during which the mobile station remains in sleep mode. The method also comprises, in the base station, transmitting a first message to the mobile station at a predetermined listening time, the first message indicating whether the mobile station should terminate sleep mode to receive downlink data and indicating an initial periodic ranging time during which the mobile station is to perform the ranging process. The method also comprises, in the mobile station, performing the ranging process at the indicated initial periodic ranging time. The method also comprises, in the base station, transmitting a second message to the mobile station in response to the mobile station performing the ranging process, the second message comprising information required for performing the ranging process and, if a subsequent periodic ranging time is determined to occur during the sleep time interval, further indicating the subsequent periodic ranging time.

In yet another embodiment, a method of performing a ranging process between a base station and a mobile station in sleep mode in a wireless access system comprises transmitting a first message to the mobile station at a predetermined listening time during a sleep time interval, the first message indicating whether the mobile station should terminate sleep mode to receive downlink data and indicating an initial periodic ranging time during which the mobile station is to perform the ranging process. The method also comprises determining, in response to the mobile station performing the ranging process, whether a subsequent periodic ranging time occurs during the sleep time interval. The method also comprises transmitting a second message to the mobile station, the second message comprising information required for performing the ranging process and, if the subsequent periodic ranging time was determined to occur during the sleep time interval, further indicating the subsequent periodic ranging time.

In still another embodiment, a method of performing a ranging process between a base station and a mobile station in sleep mode in a wireless access system comprises setting and remaining in sleep mode during a sleep time interval. The method also comprises receiving a first message at a predetermined listening time, the first message indicating whether sleep mode should be terminated to receive downlink data and indicating an initial periodic ranging time. The method also comprises performing the ranging process at the indicated initial periodic ranging time. The method also comprises receiving a second message, the second message comprising information required for performing the ranging process and indicating a subsequent periodic ranging time. The method also comprises performing the ranging process at the subsequent periodic ranging time.

In yet another embodiment, a method of performing a ranging process between a base station and a mobile station in a wireless access system, wherein the base station provides the mobile station with an initial notification of a periodic ranging time that occurs during a sleep time interval and during which the mobile station is to perform the ranging process, the initial notification included in a first message, the first message indicating whether the mobile station should enter sleep mode, and wherein the base station provides the mobile station with subsequent notifications of periodic ranging times that occur during the sleep time interval, the subsequent notifications indicated in a second message, the second message transmitted to the mobile station as part of the ranging process such that the mobile station performs a plurality of ranging processes within the sleep time interval.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

FIG. 1 illustrates an exemplary sleep request message transmitted by a mobile station to a serving base station to request sleep mode.

FIG. 2 illustrates an exemplary sleep response message transmitted by the serving base station to the mobile station.

FIG. 3 illustrates an exemplary broadcast traffic indication message transmitted to the mobile station at a certain interval.

FIG. 4 is a signal flow diagram illustrating conventional operation in the sleep mode.

FIG. 8 illustrates an exemplary transmission of the next ranging time in a ranging response message, according to an embodiment of the present invention.

FIG. 9 illustrates an exemplary notification of the mobile station of a periodic ranging cycle and an initial ranging time through a sleep response message, according to an embodiment of the present invention.

DETAILED DESCRIPTION OF THE PREFERRED EMBODIMENTS

Figure 5:
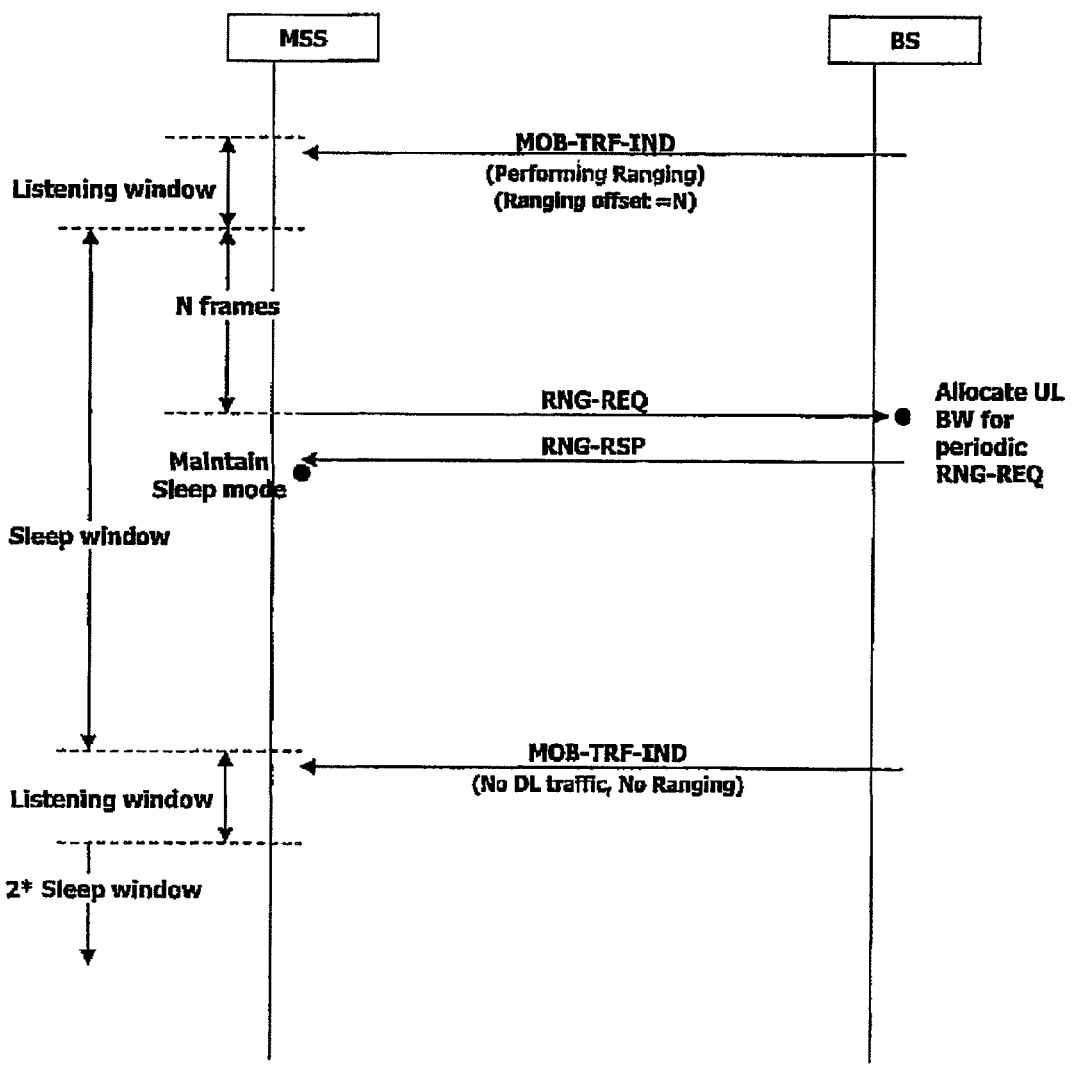
FIG. 5 illustrates periodic ranging of a mobile station in the sleep mode.
Figures 6, 7:
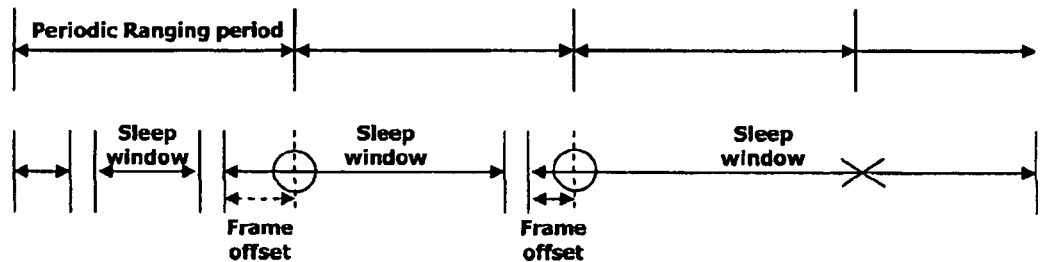
FIG. 6 illustrates a relationship between a sleep ID bitmap and a sleep ID in a traffic indication message.
FIG. 7 illustrates a relationship between a periodic ranging period and a sleep interval.

Reference will now be made in detail to the preferred embodiments of the present invention, examples of which are illustrated in the accompanying drawings. Wherever possible, the same reference numbers will be used throughout the drawings to refer to the same or like parts.

The present invention may enable a mobile station (MS) in a sleep mode to perform periodic ranging more than once during a single sleep interval, when the sleep interval is longer than a ranging cycle. Accordingly, various ranging methods are discussed.

In a first ranging method, a base station notifies a mobile station of a next ranging time (e.g., ranging offset) through a ranging response (e.g., RNG-RSP) message. In a second ranging method, a base station notifies a mobile station of a periodic ranging time that is initially performed after transitioning into a sleep mode through a sleep response (e.g., MOB-SLP-RSP) message, and notifies the mobile station of a next periodic ranging tine through a ranging response (e.g., RNG-RSP) message. In a third ranging method a base station notifies a mobile station of an initial periodic ranging time and a next ranging cycle through a sleep response (e.g., MOB-SLP-RSP) message to the mobile station upon transition to a sleep mode.

The first ranging method may be used for mobile stations that must perform a plurality of periodic ranging operations during a single sleep interval. The mobile station is notified of a time of the initial periodic ranging during a sleep interval through a traffic indication (e.g., MOB-TRF-IND) message and is notified of a time of the next periodic ranging through a ranging response (e.g., RNG-RSP) message.

The second ranging method may enable a mobile station in sleep mode to perform periodic ranging regardless of a sleep interval. Unlike the first ranging method, the mobile station is notified of the time of the initial periodic ranging after transition to a sleep mode through a sleep response (e.g., MOB-SLP-RSP), not through a MOB-TRF-IND message.

In the third ranging method, the mobile station is notified of a ranging period through a sleep response (e.g., MOB-SLP-RSP) message. Thus, the third ranging method may be distinguished from the first and second ranging methods in that the mobile station is notified of the ranging period through a sleep response message, and not a periodic ranging response (e.g., RNG-RSP) message. When the second and third ranging methods are used, a broadcast traffic indication message MOB-TRF-IND required for a sleep mode operation may exclude a part related to a periodic ranging function.

FIG. 8 illustrates an exemplary transmission of the next ranging time in a ranging response message, according to an embodiment of the present invention. FIG. 9 illustrates an exemplary notification of the mobile station of a periodic ranging cycle and an initial ranging time through a sleep response message, according to an embodiment of the present invention. In the first and second ranging methods, the next periodic ranging time may be included in a ranging response (e.g., RNG-RSP) message in a TLV form (Type Length Value) illustrated in FIG. 8. In the third ranging method, the initial periodic ranging time and the next ranging cycle may, be included in a sleep response (e.g., MOB-SLP-RSP), illustrated in FIG. 9. Furthermore, the second ranging method may use the sleep response message of FIG. 9 that excludes a periodic ranging cycle.

A periodic ranging method of a mobile station in sleep mode in accordance with preferred embodiments of the present invention will now be described in more detail.

Figure 10:
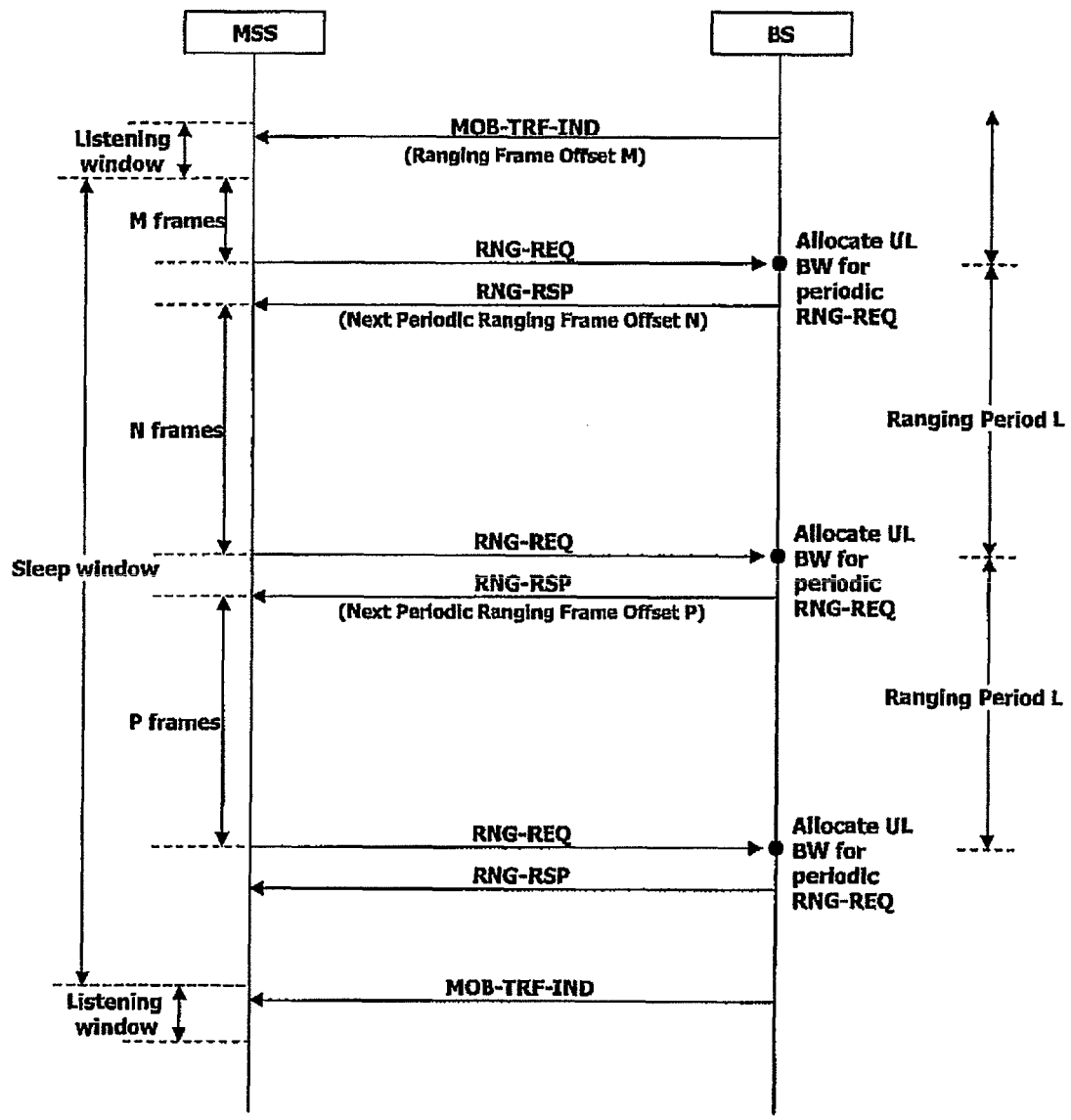
FIG. 10 illustrates a periodic ranging method for a mobile station in sleep mode, according to an embodiment of the present invention.

FIG. 10 illustrates a periodic ranging method for a mobile station in sleep mode, according to an embodiment of the present invention. In particular, FIG. 10 shows an example of the first ranging method in which the mobile station in sleep mode may perform a plurality of periodic ranging operations during a single sleep interval.

Referring to FIG. 10, a mobile station receives a traffic indication (e.g., MOB-TRF-IND) message sent from a base station during a listening interval. The base station notifies a mobile station that must perform periodic ranging during a sleep interval of a time (e.g., point) of ranging by a ranging frame offset through the MOB-TRF-IND message. When a ranging start time (e.g., ranging frame offset) has been reached while the mobile station maintains the sleep mode, the mobile station transmits to the base station a ranging request (e.g., RNG-REQ) message through an uplink slot allocated by the base station.

The base station checks whether a next periodic ranging time of the mobile station that transmitted the RNG-REQ message is within a current sleep interval. If the next periodic ranging time is within the current sleep interval, the base station includes the next ranging time in a ranging response (e.g., RNG-RSP) message and transmits the RNG-RSP message to the mobile station. The mobile station, upon receiving the next ranging time through the ranging response (e.g., RNG-RSP) message, maintains the sleep mode. When the next ranging time is reached, the mobile station transmits to the base station the RNG-REQ message through an uplink slot allocated by the base station.

The base station checks whether the next periodic ranging time of the mobile station that transmitted the RNG-REQ message is within a current sleep interval. If the next periodic ranging time is not within the current sleep interval, the base station does not include the next ranging time in the ranging response message but instead transmits the RNG-RSP message to the mobile station.

Accordingly, upon receiving the RNG-RSP message which does not include the next ranging point, the mobile station maintains the sleep mode during a sleep interval. When a listening interval is reached, the mobile station receives a traffic indication (e.g., MOB-TRF-IND) message from the base station including information regarding whether there is downlink traffic being transmitted to the mobile station or there is a need to perform ranging during the sleep interval.

Upon receiving a ranging request (e.g., RNG-REQ) message, a downlink burst profile change request (e.g., DBPC-REQ) or other uplink message aside from periodic ranging from the mobile station during a sleep interval, the base station updates a periodic ranging timer (e.g., T27). If a next periodic ranging time is within the corresponding sleep interval, the base station includes the next periodic ranging time in the RNG-RSP message or the DBPC-RSP message and transmits the message to the mobile station.

Figure 11:
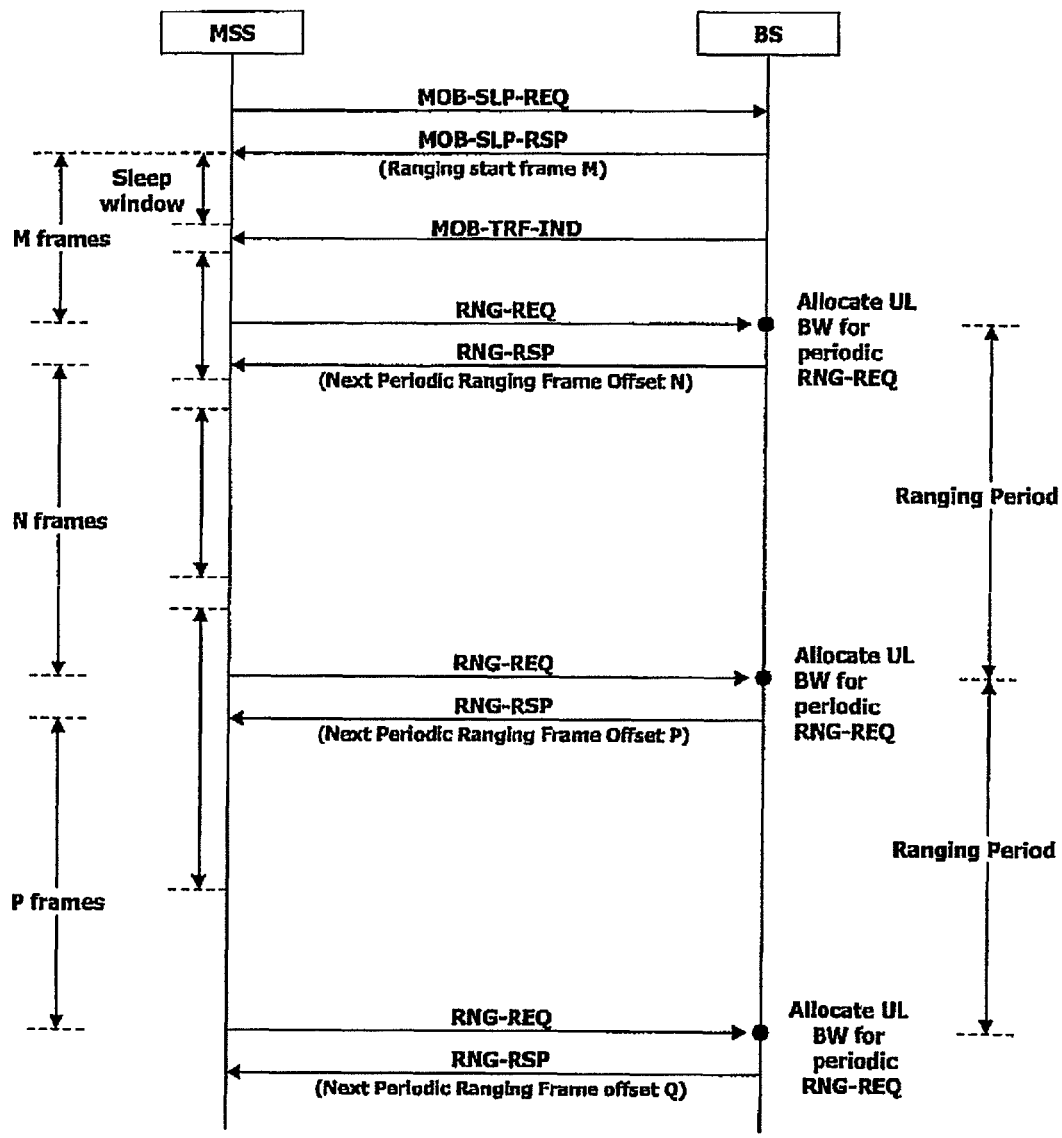
FIG. 11 illustrates a periodic ranging method for a mobile station in sleep mode, according to another embodiment of the present invention.

FIG. 11 illustrates a periodic ranging method for a mobile station in sleep mode, according to another embodiment of the present invention. In particular, FIG. 11 shows an example of the second ranging method in which the mobile station in sleep mode may perform a plurality of periodic ranging operations during a single sleep interval.

Referring to FIG. 11, the mobile station transmits a sleep request (e.g., MOB-SLP-REQ) message to a base station to request transition to a sleep mode. The base station includes in a sleep response (e.g., MOB-SLP-RSP) message, an initial periodic ranging time after the transition to the sleep mode, and transmits the message to the mobile station.

The mobile station gradually increases a sleep interval according to an algorithm and receives a traffic indication (e.g., MOB-TRF-IND) message during a listening interval in order to check whether downlink traffic is being transmitted to the mobile station. When the initial periodic ranging time has been reached, the mobile station transmits to the base station a ranging request (e.g., RNG-REQ) message through an uplink slot allocated by the base station.

The base station, upon receiving the RNG-REQ message, includes a point of the next periodic ranging in a ranging response (e.g., RNG-RSP) message and transmits the message to the mobile station. The mobile station having received the next periodic ranging time through the RNG-RSP message transmits a ranging request (e.g., RNG-REQ) message through an uplink slot allocated from the base station when the corresponding time has been reached.

Upon receiving a ranging request (e.g., RNG-REQ) message, a downlink burst profile change request (e.g., DBPC-REQ) message or other uplink message aside from periodic ranging from the mobile station in sleep mode, the base station updates a periodic ranging timer, includes a next periodic ranging time in a ranging response message or a downlink burst profile change response (e.g., DBPC-RSP) message, and transmits the message to the mobile station.

In the second ranging method, information regarding whether the ranging is performed is not transmitted through a traffic indication (e.g., MOB-TRF-IND) message. Instead, a mobile station in sleep mode receives the next periodic ranging time through the ranging response message, regardless of a sleep interval.

Figure 12:
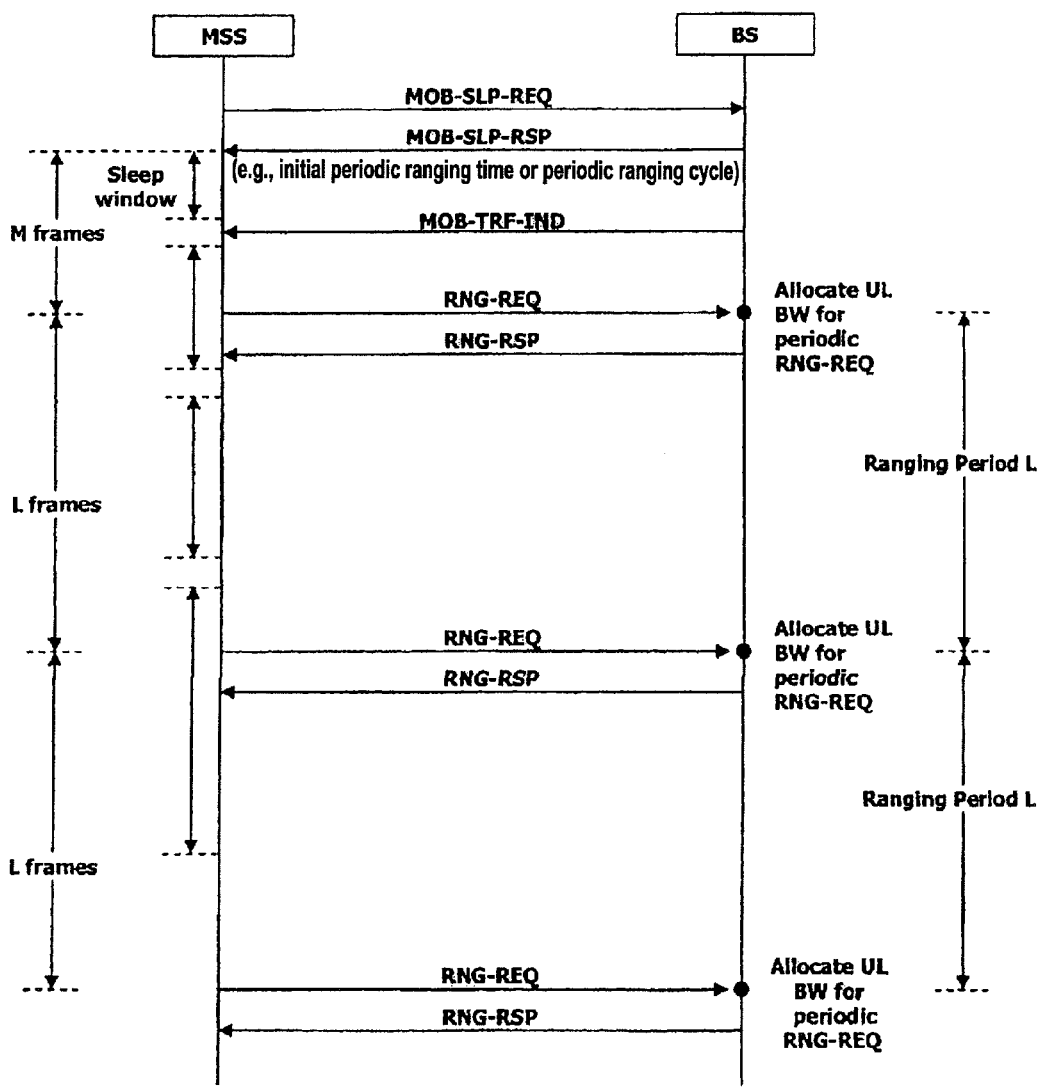
FIG. 12 illustrates a periodic ranging method for a mobile station in sleep mode, according to yet another embodiment of the present invention.

FIG. 12 illustrates a periodic ranging method for a mobile station in sleep mode, according to yet another embodiment of the present invention. In particular, FIG. 12 shows an example of the third ranging method in which the mobile station in sleep mode may perform a plurality of periodic ranging operations during a single sleep interval.

Referring to FIG. 12, the mobile station transmits a sleep request (e.g., MOB-SLP-REQ) message to a base station to request transition to a sleep mode. The base station, in response, may prepare and transmit a sleep response (e.g., MOB-SLP-RSP) message that includes an initial periodic ranging time after the transition to the sleep mode, and a periodic ranging cycle.

The mobile station gradually increases a sleep interval according to an algorithm, receives a traffic indication (e.g., MOB-TRF-IND) message during a listing interval, and checks whether there is downlink traffic being transmitted to the mobile station. When the initial periodic ranging time has been reached, the mobile station transmits a ranging request (e.g., RNG-REQ) message through an uplink slot allocated from the base station The base station, upon receiving the ranging request (e.g., RNG-REQ) message, transmits a ranging response (e.g., RNG-RSP) message to the mobile station. When the periodic ranging cycle included in the sleep response (e.g., MOB-SLP-RSP) message has been reached, the mobile station transmits a ranging request (e.g., RNG-REQ) message through an uplink slot allocated from the base station. The base station, upon receiving the ranging request (e.g., RNG-REQ) message, transmits a ranging response (e.g., RNG-RSP) message to the mobile station. Then, while maintaining a sleep mode, the mobile station repetitively transmits and receives the ranging request (e.g., RNG-REQ) message and the ranging response (e.g., RNG-RSP) message.

Figure 13:
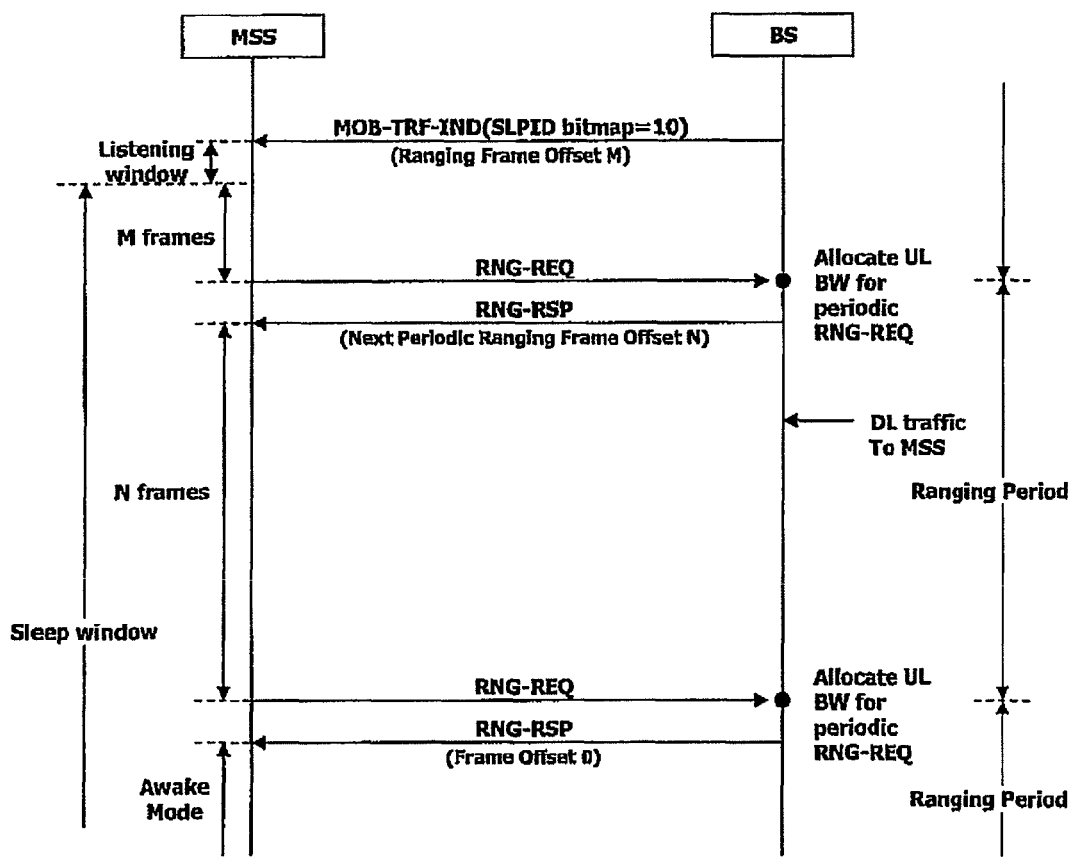
FIG. 13 illustrates an exemplary notification to the mobile station of generation of downlink traffic being transmitted to the mobile station in the sleep mode during a sleep interval in a periodic ranging process through a periodic ranging response message, according to an embodiment of the present invention.

FIG. 13 illustrates an exemplary notification to the mobile station of generation of downlink traffic being transmitted to the mobile station in the sleep mode during a sleep interval in a periodic ranging process through a periodic ranging response message, according to an embodiment of the present invention.

In a conventional approach, when downlink traffic is generated during a sleep interval, the mobile station is notified of the generation of the down traffic through a traffic indication (e.g., MOB-TRF-IND) message transmitted during a listening interval after a corresponding sleep interval expires. However, if the sleep interval is too long, problems may occur in that the base station must perform buffering of downlink data for a long time to avoid data loss.

Therefore, in a fourth ranging method, when a mobile station performs periodic ranging during the sleep interval, the base station notifies the mobile station of the downlink traffic generation through a ranging response (e.g., RNG-RSP) message, such that the mobile station terminates a sleep mode during the sleep interval and receives data. As an example of a ranging response message setting, a value of ranging offset TLV may be set as 0 to indicate downlink traffic generation.

In one embodiment, a method of performing a ranging process between a base station and a mobile station in sleep mode in a wireless access system, wherein the base station provides the mobile station with an initial notification of a periodic ranging time that occurs during a sleep time interval and during which the mobile station is to perform the ranging process, the initial notification included in a first message, the first message indicating whether the mobile station should terminate sleep mode to receive downlink data, and wherein the base station provides the mobile station with subsequent notifications of periodic ranging times that occur during the sleep time interval, the subsequent notifications indicated in a second message, the second message transmitted to the mobile station as part of the ranging process such that the mobile station performs a plurality of ranging processes within the sleep time interval.

The first message may be a traffic indicator message and the second message may be a ranging response message. The subsequent notifications of periodic ranging times in the second message may comprise a type length value (TLV) form. The initial notification of periodic ranging time in the first message may comprise a type length value (TLV) form. The second message may comprise an indication whether the mobile station should terminate sleep mode to receive downlink data. The indication whether the mobile station should terminate sleep mode to receive downlink data may comprise a type length value (TLV) form.

In another embodiment, a method of performing a ranging process between a base station and a mobile station in sleep mode in a wireless access system comprises, in the mobile station, setting a sleep time interval during which the mobile station remains in sleep mode. The method also comprises, in the base station, transmitting a first message to the mobile station at a predetermined listening time, the first message indicating whether the mobile station should terminate sleep mode to receive downlink data and indicating an initial periodic ranging time during which the mobile station is to perform the ranging process. The method also comprises, in the mobile station, performing the ranging process at the indicated initial periodic ranging time. The method also comprises, in the base station, transmitting a second message to the mobile station in response to the mobile station performing the ranging process, the second message comprising information required for performing the ranging process and, if a subsequent periodic ranging time is determined to occur during the sleep time interval, further indicating the subsequent periodic ranging time.

In yet another embodiment, a method of performing a ranging process between a base station and a mobile station in sleep mode in a wireless access system comprises transmitting a first message to the mobile station at a predetermined listening time during a sleep time interval, the first message indicating whether the mobile station should terminate sleep mode to receive downlink data and indicating an initial periodic ranging time during which the mobile station is to perform the ranging process. The method also comprises determining, in response to the mobile station performing the ranging process, whether a subsequent periodic ranging time occurs during the sleep time interval. The method also comprises transmitting a second message to the mobile station, the second message comprising information required for performing the ranging process and, if the subsequent periodic ranging time was determined to occur during the sleep time interval, further indicating the subsequent periodic ranging time.

In still another embodiment, a method of performing a ranging process between a base station and a mobile station in sleep mode in a wireless access system comprises setting and remaining in sleep mode during a sleep time interval. The method also comprises receiving a first message at a predetermined listening time, the first message indicating whether sleep mode should be terminated to receive downlink data and indicating an initial periodic ranging time. The method also comprises performing the ranging process at the indicated initial periodic ranging time. The method also comprises receiving a second message, the second message comprising information required for performing the ranging process and indicating a subsequent periodic ranging time. The method also comprises performing the ranging process at the In yet another embodiment, a method of performing a ranging process between a base station and a mobile station in a wireless access system, wherein the base station provides the mobile station with an initial notification of a periodic ranging time that occurs during a sleep time interval and during which the mobile station is to perform the ranging process, the initial notification included in a first message, the first message indicating whether the mobile station should enter sleep mode, and wherein the base station provides the mobile station with subsequent notifications of periodic ranging times that occur during the sleep time interval, the subsequent notifications indicated in a second message, the second message transmitted to the mobile station as part of the ranging process such that the mobile station performs a plurality of ranging processes within the sleep time interval.

Furthermore, the ranging method for a mobile station in sleep mode in accordance with preferred embodiments of the present invention may be used not only for the periodic ranging but also as a method in which a base station examines effectiveness of the mobile station. Specifically, the method may be applied for updating effectiveness with respect to the mobile station as the base station enables the mobile station to perform ranging and receives a ranging request message from the mobile station.

The present invention may enable a mobile station in a sleep mode to perform periodic ranging regardless of a sleep interval. Particularly, one ranging method is advantageous in that the mobile station in sleep mode may perform periodic ranging while maintaining the sleep mode operation in accordance with the related art. Another ranging method is advantageous in that a length of a traffic indication message sent to the mobile station in sleep mode may be reduced and radio resources required for traffic indication message transmission may also be reduced by excluding a part related to a periodic ranging function from a broadcast traffic indication message required for a sleep mode operation.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A base station (BS) for checking status of a mobile station (MS) in a sleep mode, the BS comprising:
  a processor configured to:
    receive a sleep request (SLP-REQ) message from the MS;
    transmit a sleep response (SLP-RSP) message to the MS in response to the SLP-REQ message, the SLP-RSP message comprising a first periodic ranging frame offset;
    allocate a first uplink bandwidth (UL-BW) when a first time indicated by the first periodic ranging frame offset is reached, the first UL-BW allocated for a ranging request (RNG-REQ) message to be transmitted by the MS;
    receive the RNG-REQ message which is transmitted through the first UL-BW from the MS;
    transmit a ranging response (RNG-RSP) message to the MS in response to the RNG-REQ message, the RNG-RSP message comprising information required for performing a ranging process and a second periodic ranging frame offset;
    allocate a second uplink bandwidth (UL-BW) when a second time indicated by the second periodic ranging frame offset is reached, the second UL-BW allocated for an additional RNG-REQ message to be transmitted by the MS; and
    receive the additional RNG-REQ message which is transmitted through the second UL-BW from the MS.

2. The base station of claim 1,
  wherein the SLP-REQ message comprises a start frame initial sleep window, a final sleep window, a listening interval and a final sleep window exponent, and
  wherein the SLP-RSP message further comprises a periodic ranging cycle, a sleep identifier (SLPID), the start frame initial sleep window, the final sleep window, the listening interval and the final sleep window exponent.

3. The base station of claim 1, wherein the processor is further configured to check the status of the mobile station by the RNG-REQ message.

4. The base station of claim 1, wherein the first periodic ranging frame offset of the SLP-RSP message comprises a type length value (TLV) form.

5. The base station of claim 1, wherein the second periodic ranging frame offset of the RNG-RSP message comprises a type length value (TLV) form.

6. A mobile station (MS) for processing a signal in a sleep mode, the MS comprising:
  a processor configured to:
    transmit a sleep request (SLP-REQ) message to a base station (BS);
    receive a sleep response (SLP-RSP) message from the BS in response to the SLP-REQ message, the SLP-RSP message comprising a first periodic ranging frame offset;
    transmit a ranging request (RNG-REQ) message through a first uplink bandwidth (UL-BW) to the BS, wherein the first UL-BW is allocated by the BS when a first time indicated by the first periodic ranging frame offset is reached;
    receive a ranging response (RNG-RSP) message from the BS in response to the RNG-REQ message, the RNG-RSP message comprising information required for performing a ranging process and a second periodic ranging frame offset; and
    transmit an additional RNG-REQ message through a second UL-BW to the BS, wherein the second uplink bandwidth (UL-BW) is allocated by the BS when a second time indicated by the second periodic ranging frame offset is reached.

7. The mobile station of claim 6,
  wherein the SLP-REQ message comprises a start frame initial sleep window, a final sleep window, a listening interval, and a final sleep window exponent, and
  wherein the SLP-RSP message further comprises a periodic ranging cycle, a sleep identifier (SLPID), the start frame initial sleep window, the final sleep window, the listening interval, and the final sleep window exponent.

8. The mobile station of claim 6, wherein the first periodic ranging frame offset of the SLP-RSP message comprises a type length value (TLV) form.

9. The mobile station of claim 6, wherein the second periodic ranging frame offset of the RNG-RSP message comprises a type length value (TLV) form.

* * * * *